Dec. 16, 1930.  A. W. MATTHEWS  1,784,940
ART OF MAKING SHOES
Filed March 9, 1929
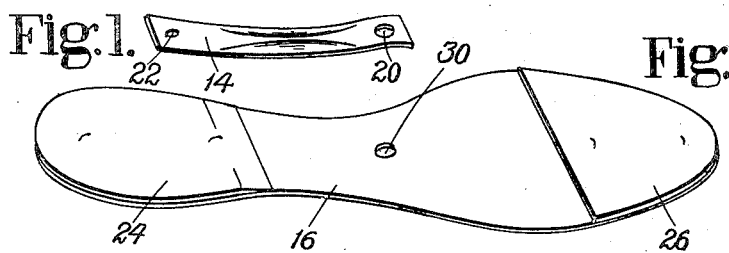
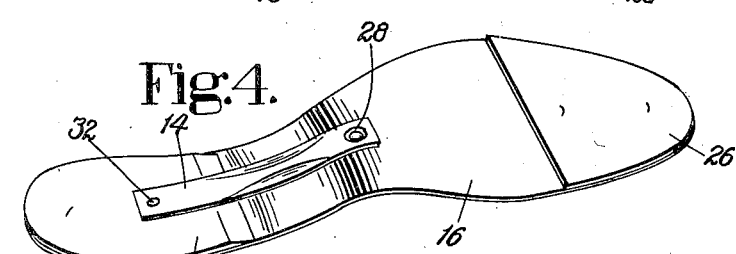
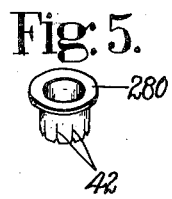
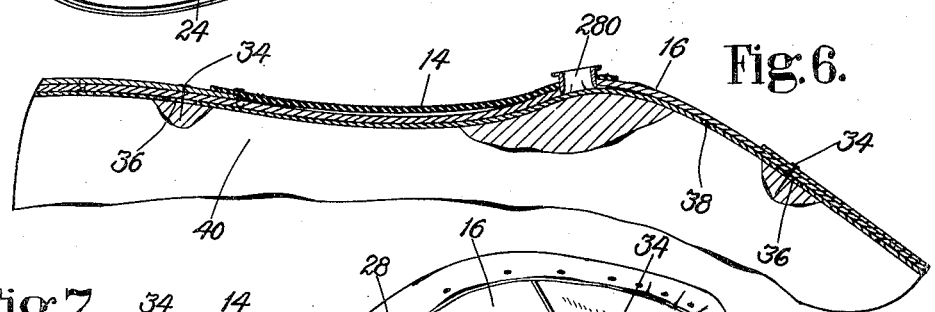
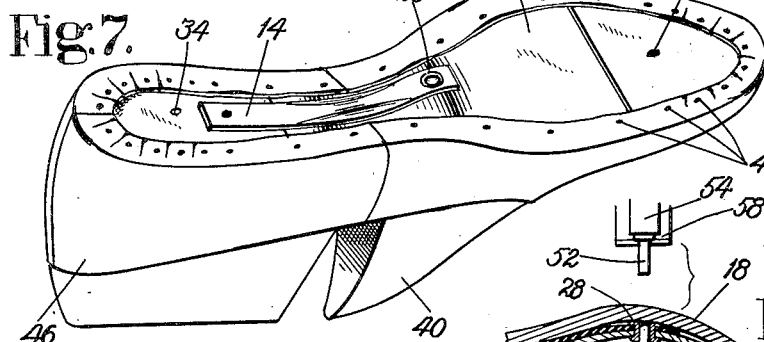
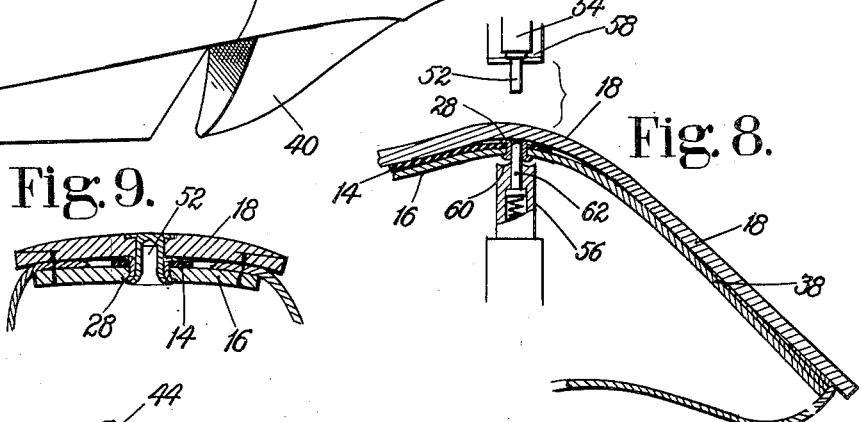
INVENTOR
Algernon W. Matthews
By his Attorney,
Nelson K. Howard Patented Dec. 16, 1930

1,784,940

UNITED STATES PATENT OFFICE

ALGERNON W. MATTHEWS, OF HAVERHILL, MASSACHUSETTS, ASSIGNOR TO UNITED SHOE MACHINERY CORPORATION, OF PATERSON, NEW JERSEY, A CORPORATION OF NEW JERSEY

ART OF MAKING SHOES

Application filed March 9, 1929. Serial No. 345,822.

This invention relates to improvements in the art of making shoes and to improvements in shoe construction. The invention is herein illustrated in its application to the manufacture of McKay-sewed shoes although in certain aspects it is useful in connection with the manufacture of other types of shoes, for example, welt shoes, wherein it is desired to secure firmly together an insole, a shank stiffener, and an outsole.

In both McKay-sewed and welt shoes a shank stiffener is located between the inner and outer soles and frequently the stiffener is secured to both soles. Heretofore, however, the securing means has usually been of such a character that it has failed to hold the parts firmly together throughout the life of the shoe.

One object of the present invention is to provide an improved method of securing a shank stiffener to both the inner and outer soles of a shoe, which will result in permanently securing the parts together in such a manner as to insure that there will be no tendency for them to become loosened or displaced relatively to one another while the shoe is being worn.

With this object in view the invention, in one aspect, consists in a novel method of making shoes having inner and outer soles which comprises assembling a shank stiffener and an insole, each having a fastener-receiving hole preliminarily formed therein, and securing the shank stiffener to the insole with said holes in registration, securing an upper to the insole, assembling an outsole with the insole and the upper, utilizing said holes to locate a fastener at the outer side of the outsole in alinement with the said holes, and passing the fastener inwardly through the outsole and through the registered holes in the insole and shank stiffener to secure together the outsole, shank stiffener and insole. As herein illustrated, an eyelet inserted through the alined holes in the shank stiffener and insole constitutes the means for initially securing the shank stiffener to the insole, and a tubular rivet which is passed through the eyelet serves to secure the insole and the shank stiffener to the outsole. As illustrated also, there is no hole preliminarily formed in the outsole for receiving the rivet but the hole in the outsole through which the rivet extends is made by the rivet as the rivet is forced inwardly through the sole from the outside of the shoe, and the rivet is located in line with the holes in the insole and the stiffener by utilizing the eyelet in conjunction with a gaging device associated with the means employed to drive the rivet.

Considered in another aspect, the invention consists in the provision, in a shoe comprising an insole, an outsole, and a shank stiffener located between the soles, of a fastener securing together the shank stiffener and the insole, and a second fastener having holding engagement with the first fastener and constructed and arranged to secure together the insole, the shank stiffener and the outsole.

The invention will be described with reference to the accompanying drawings, in which Fig. 1 is a perspective view of a shank stiffener having a fastener-receiving hole therein;

Fig. 2 is a perspective view of an insole for a McKay-sewed shoe having a fastener-receiving hole formed therein;

Fig. 3 is a perspective view of an eyelet employed for the purpose of securing the shank stiffener to the insole;

Fig. 4 is a perspective view of the insole as it appears after the shank stiffener has been secured thereto by means of the eyelet shown in Fig. 3;

Fig. 5 is a perspective view of a modified form of eyelet;

Fig. 6 is a longitudinal sectional view of the insole showing the insole tacked to a last and illustrating the manner in which a shank stiffener is secured to the insole by the use of an eyelet of the type shown in Fig. 5;

Fig. 7 is a perspective view of a McKay-sewed shoe as it appears after the upper has been lasted over and secured to an insole to which a shank stiffener has previously been secured;

Fig. 8 is a longitudinal sectional view of the shoe shown in Fig. 7 as it appears after the outsole has been secured to the shoe and the last removed, and illustrating the manner of driving a rivet to secure the outsole to the insole and shank stiffener;

Fig. 9 is a transverse sectional view of a portion of a completed McKay shoe constructed in accordance with the present invention; and Fig. 10 is a longitudinal sectional view illustrating an alternative manner of setting an eyelet for securing a shank stiffener to an insole.

The drawings illustrate an improved method in accordance with which a shank stiffener 14 is firmly secured both to the insole 16 and the outsole 18 of a McKay-sewed shoe and a novel shoe in the manufacture of which the method may be practised. The shank stiffener 14 consists of a strip of hardened metal such as tempered steel curved longitudinally to correspond to the longitudinal curvature at the bottom of the shank portion of the last for the shoe in which the shank stiffener is to be used. A fastener-receiving hole 20 (Fig. 1) is punched or formed in any suitable manner in the forward end portion of the stiffener 14 and a tack hole 22 is formed in the rear portion of the stiffener. As shown, the heel and toe portions of the insole 16 are reinforced by heel and toe pieces 24 and 26, respectively, which may be formed of leatherboard and stapled or otherwise suitably secured to the insole. To enable the shank stiffener to be secured to the insole by means of an eyelet, such as the eyelet 28 shown in Fig. 3, a circular hole 30 is preliminarily punched in the insole 16, the hole 30 being so located that the eyelet will function to locate the shank stiffener in the desired relation lengthwise with respect to the insole and will also serve to locate the front portion of the shank stiffener in the desired central or transverse relation to the insole. At its rear end the shank stiffener 14 may be secured to the insole in the usual manner as by means of a tack 32 extending through the hole 22 and into or through the heel portion of the sole. As illustrated in Fig. 4, the shank stiffener 14 may be secured to the insole, at least at the forward end of the stiffener, before the insole is tacked to the last. The securing in place of the forward portion of the shank stiffener is accomplished by inserting the eyelet 28 through the hole 30 in the insole and setting the eyelet in the usual manner. If desired, however, the insole may be applied to the last before the shank stiffener is secured to the insole, the insole being secured in the usual way by tacks 34 (Figs. 6 and 7) which are driven through the usual holes 36 in the metal bottom plate 38 of a last 40. If the insole is applied to the last before the eyelet is inserted through the apertures 20 and 30 in the shank stiffener and the insole, the metal plate upon the bottom of the last will be relied upon to clench the barrel of the eyelet from the inner side of the insole. If the eyelet is to be applied in this manner it is preferable to use an eyelet such as that shown at 280 in Fig. 5, this eyelet having its barrel scored as indicated at 42 to facilitate the clenching or the setting of the eyelet. Another mode of applying an eyelet is illustrated in Fig. 10. As shown, an eyelet 28 is placed with its head against the bottom of the last and with its barrel extending through the apertures in the insole and the shank stiffener. The barrel of the eyelet may then be set by the use of an ordinary eyelet set, such as shown at 44. This manner of applying the eyelet enables the upper to be lasted over the insole, if desired, before the shank stiffener is applied. The shank stiffener is herein shown as being secured at its rear portion to the insole by means of a tack 32.

After the insole has been tacked to the last and the shank stiffener has been secured by means of an eyelet to the insole, the upper 46 is lasted over the insole and secured thereto as by the usual lasting tacks 48. Thereafter, the outsole 18 is laid, the last is pulled and the outsole is secured to the insole and upper by through-and-through stitching in the usual manner.

As herein shown the shank stiffener and the insole are secured to the outsole by means of a tubular rivet 52 (Figs. 8 and 9) which may be driven inwardly through the outsole and through the eyelet either before or after the outsole has been stitched to the insole and the upper. There may be employed for the purpose of driving and setting the rivet 52 a rivet-driving device of any well-known character such as the device shown in Fig. 8. The illustrated rivet-driving device comprises a rivet-driving plunger 54 which is adapted to be located outside of the shoe and a rivet-setting device 56 extends into the inside of the shoe and is adapted to support the soles while the rivet is being driven and to clench the inner or lower end of the rivet over against the eyelet on the inside of the shoe. In Fig. 8 a rivet 52 is shown as being temporarily supported beneath the driving plunger 54 by means of spring fingers 58 in a position to be driven through the outsole. When driven the rivet will be caused to cut its way through the outsole and to facilitate its passage through the outsole it is preferably formed with the free extremity of its barrel portion sharpened or beveled. The upper portion of the member 56 is cupped or concaved as shown at 60 to facilitate the setting of the eyelet. In order that the shoe may be positioned with the eyelet in coaxial alinement with a rivet which is positioned beneath the driving plunger 54, the lower member 56 of the rivet-applying device is provided, as shown, with a locating pin 62 which is carried by the member 56 and which is maintained yieldingly in position to enter the eyelet in the insole, the pin 62 being coaxial with the member 56 and the plunger 54 so that it will locate the eyelet in position to receive the rivet. The yielding mounting of the positioning pin 62 permits it to be displaced below the eyelet by the rivet as the latter is forced through the eyelet. After the rivet 52 has been set the forward end of the stiffener will be firmly and permanently secured in place.

A shoe in which a shank stiffener has been incorporated in accordance with the above-described method will have a shank portion which is adequately reinforced against bending and after the heel has been attached it will overlie and support the shank stiffener and the shank portion of the shoe will then be reinforced against lateral twisting. The shank stiffener terminating as usual in the vicinity of the ball line, the bottom of the shoe will be capable of flexing at the ball line in the usual manner. It will be seen that the fastening device consisting of the eyelet 28 and the rivet 52 may be applied without interfering with or retarding the steps customarily performed in the making of a shoe.

The above-described method is particularly advantageous in the manufacture of McKay-sewed shoes having exceptionally narrow shank portions, inasmuch as by securing the shank stiffener to the insole before the upper is lasted over, a firm bearing will be provided for the shank stiffener throughout its length, a condition difficult to obtain in narrow shank shoes when the upper is lasted over the insole before the shank stiffener is secured thereto. The mode of applying the eyelet 28 illustrated in Fig. 10, however, enables the upper to be lasted over the insole before the shank stiffener is secured thereto as may be desirable in shoes in which the shank portions are not extremely narrow.

Having described my invention, what I claim as new and desire to secure by Letters Patent of the United States is:

1. The method of making shoes which comprises assembling a shank stiffener and an insole, each having a fastener-receiving hole preliminarily formed therein, and securing the shank stiffener to the insole with said holes in registration, securing an upper to the insole, assembling an outsole with the insole and upper, utilizing said holes to locate a fastener at the outer side of the outsole in alinement with said holes, and passing the fastener inwardly through the outsole and through the registered holes in the insole and shank stiffener to secure together the outsole, shank stiffener and insole.

2. The method of making shoes which comprises assembling a shank stiffener and an insole, each having a fastener-receiving hole preliminarily formed therein, and passing a fastener through said holes to secure the stiffener to the insole, securing an upper to the insole, assembling an outsole with the insole and upper, and passing a fastener through the outsole and through the registered holes in the insole and stiffener to secure together the outsole, the insole, and the stiffener.

3. The method of making shoes which comprises assembling together a shank stiffener and an insole, each having a fastener-receiving hole preliminarily formed therein, and securing the shank stiffener to the insole with said holes in registration, laying the insole upon a last, lasting an upper and securing it to the insole, assembling an outsole with the insole and upper, and passing a fastener through the outsole and through the holes in the insole and shank stiffener to secure the soles and the stiffener together.

4. That improvement in methods of making shoes which consists in passing a fastener through a hole in a shank stiffener and into an insole to secure the shank stiffener to the insole, and passing another fastener through an outsole and through said hole in the shank stiffener to secure the outsole to the shank stiffener and insole.

5. That improvement in methods of making shoes which consists in passing a fastener through a hole in a shank stiffener and into an insole to secure the shank stiffener to the insole, and passing another fastener through the outsole and into holding engagement with the fastener in the insole to secure the outsole to the shank stiffener and the insole.

6. That improvement in methods of making shoes which consists in passing a fastener through a hole in a shank stiffener and into an insole to secure the insole to the shank stiffener, thereafter applying the insole to a last, lasting an upper over the insole, laying an outsole, and passing a fastener through the outsole and engaging it with the fastener in the insole to secure together the outsole, the insole, and the shank stiffener.

7. That improvement in methods of making shoes which consists in passing an eyelet through a shank stiffener and through an insole and setting the eyelet to secure the shank stiffener to the insole, lasting an upper over the insole, laying an outsole, and passing a rivet through the outsole and through the eyelet and setting the rivet to secure together the outsole, the insole and the shank stiffener.

8. That improvement in methods of making shoes which consists in forming a hole through the front end portion of a shank stiffener, forming a hole through the shank portion of an insole, passing a fastener through said holes to secure the stiffener to the insole, securing the rear portion of the stiffener to the insole, tacking the insole to a last, lasting an upper and securing it to the insole, laying an outsole, and passing a fastener through the outsole and through the holes in the insole and shank stiffener to secure the soles and the stiffener together.

9. That improvement in the manufacture of shoes having inner and outer soles secured together by through-and-through stitching which consists in passing an eyelet through a hole in a shank stiffener and through a hole in an insole and clenching the eyelet to secure the shank stiffener and the insole together, securing the insole to a last, lasting an upper and securing it to the insole, laying an outsole, pulling the last, stitching the outsole to the insole and upper, utilizing the eyelet to position the shoe relatively to the co-operating members of a rivet-setting device with the eyelet in line with said members, and operating said device to drive a rivet inwardly through the outsole and the eyelet and to clench the rivet thereby securing together the outsole, the shank stiffener and the insole.

10. That improvement in methods of making shoes which consists in securing together an insole and a shank stiffener having a fastener-receiving hole therein by passing a fastener through said hole and through the insole, and securing the insole and shank stiffener to an outsole by passing another fastener through the outsole, through said hole in the shank stiffener and through the insole.

11. That improvement in methods of making shoes which consists in passing an eyelet through a shank stiffener and an insole and setting the eyelet to secure the stiffener to the insole, and thereafter passing a fastener through an outsole and through said eyelet to secure the insole and the shank stiffener to the outsole.

12. That improvement in methods of making shoes which consists in passing an eyelet through a shank stiffener and an insole and setting the eyelet to secure the stiffener to the insole, and thereafter forcing a tubular rivet inwardly through an outsole and through said eyelet and clenching the inner end of the rivet over the eyelet to secure together the outsole, the shank stiffener and the insole.

13. That improvement in methods of making shoes which consists in passing an eyelet through a shank stiffener and an insole and setting the eyelet to secure the stiffener to the insole, thereafter utilizing the eyelet in conjunction with gaging means associated with a fastener-driving device for locating a fastener outside of the shoe in line with the eyelet, and driving the fastener inwardly through the outsole and through the eyelet to secure together the outsole, the shank stiffener and the insole.

14. A shoe comprising, in combination, an insole, an outsole, a shank stiffener located between the soles, a fastener securing together the shank stiffener and the insole, and a second fastener having holding engagement with the first fastener and constructed and arranged to secure together the insole, the shank stiffener and the outsole.

15. A shoe comprising, in combination, an insole, an outsole, a shank stiffener located between the soles, an eyelet extending through the shank stiffener and insole and securing said parts together, and a fastener extending through the outsole and through the eyelet and securing the outsole to the insole and shank stiffener.

16. A shoe comprising, in combination, an insole, an outsole, a shank stiffener located between the soles, an eyelet extending through the shank stiffener and insole and securing said parts together, and a rivet extending through the outsole and through the eyelet and securing the outsole to the insole and shank stiffener.

17. A shoe comprising, in combination, an insole, an outsole, a shank stiffener located between the soles, a fastener securing the forward portion of the shank stiffener to the insole, means for securing the rear portion of the shank stiffener to the insole, and means for securing the outsole to said fastener.

18. A shoe comprising, in combination, an insole, an outsole and an upper secured together by through-and-through stitching, a shank stiffener located between the soles within the space bounded by the margins of the upper and having a fastener-receiving hole therein, a fastener extending through the inner sole and through said hole in the stiffener and rigidly securing the inner sole and the stiffener together, and means for securing the outsole to the stiffener.

In testimony whereof I have signed my name to this specification.

ALGERNON W. MATTHEWS.